(12) United States Patent
Sung et al.

(10) Patent No.: US 12,149,648 B2
(45) Date of Patent: Nov. 19, 2024

(54) ELECTRONIC DEVICE AND PREVENTION METHOD FOR PREVENTING DETERIORATION BY OPERATION OF ANTENNA MODULE

(71) Applicant: Samsung Electronics Co., Ltd., Suwon-si (KR)

(72) Inventors: Kicheol Sung, Suwon-si (KR); Yeonwoo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 145 days.

(21) Appl. No.: 17/869,178

(22) Filed: Jul. 20, 2022

(65) Prior Publication Data

US 2023/0011847 A1    Jan. 12, 2023

Related U.S. Application Data

(63) Continuation of application No. PCT/KR2022/007526, filed on May 27, 2022.

(30) Foreign Application Priority Data

Jul. 6, 2021  (KR) .......................... 10-2021-0088585

(51) Int. Cl.
 *H04M 1/02* (2006.01)
(52) U.S. Cl.
 CPC ....... *H04M 1/0245* (2013.01); *H04M 1/0216* (2013.01)
(58) Field of Classification Search
 CPC ............ H04M 1/0245; H04M 1/0216; H04M 1/0214; H04M 1/0235; H01Q 1/24
 See application file for complete search history.

(56) References Cited

U.S. PATENT DOCUMENTS 7,525,493 B2 *  4/2009  Iwai ....................... H01Q 1/245
                                                                343/702
10,992,368 B1    4/2021  Chisu et al.
(Continued)

FOREIGN PATENT DOCUMENTS

KR    10-2017-0101310 A    9/2017
KR       10-1822375 B1    1/2018
(Continued)

OTHER PUBLICATIONS

International Search Report dated Aug. 31, 2022, issued in International Patent Application No. PCT/KR2022/007526.
(Continued)

*Primary Examiner* — Lewis G West
(74) *Attorney, Agent, or Firm* — Jefferson IP Law, LLP

(57) ABSTRACT

An electronic device and method of preventing deterioration by an operation of an antenna are provided. The electronic device includes a display configured to be folded and unfolded, and provide content, a sensor configured to detect a state change of the display, an antenna configured to transmit and receive an electromagnetic wave, and at least one processor electrically connected to the display, the sensor, and the antenna, in which the at least one processor is configured to detect a state change of the display by using the sensor, identify one or more operating electronic circuitry among electronic circuitries in the electronic device, determine an electronic circuitry in which deterioration is caused by an operation of the antenna among the one or more operating electronic circuitry, based on the state change of the display, and deactivate a certain beam among beams generated by the antenna to reduce deterioration of the determined electronic circuitry.

19 Claims, 7 Drawing Sheets

(56) References Cited

U.S. PATENT DOCUMENTS

| | | | |
|---|---|---|---|
| 11,863,260 B2* | 1/2024 | Na | H01Q 3/02 |
| 2017/0237153 A1* | 8/2017 | Chang | H01Q 1/245 |
| | | | 343/876 |
| 2018/0018929 A1 | 1/2018 | Xun et al. | |
| 2018/0145718 A1* | 5/2018 | Margomenos | H04B 7/0413 |
| 2018/0316379 A1* | 11/2018 | Chang | H01Q 1/245 |
| 2020/0135140 A1* | 4/2020 | Binboga | G06F 3/147 |
| 2020/0177226 A1 | 6/2020 | Cha et al. | |
| 2020/0194904 A1* | 6/2020 | Huh | H01Q 21/24 |
| 2021/0126697 A1* | 4/2021 | Kumar | H04B 15/00 |
| 2022/0109472 A1* | 4/2022 | Na | H04B 7/0617 |

FOREIGN PATENT DOCUMENTS

| | | |
|---|---|---|
| KR | 10-2019-0016944 A | 2/2019 |
| KR | 10-2020-0074411 A | 6/2020 |
| KR | 10-2020-0144772 A | 12/2020 |
| WO | 2020/180722 A1 | 9/2020 |

OTHER PUBLICATIONS

Extended European Search Report dated Oct. 9, 2024, issued in European Patent Application No. 22837818.8.

\* cited by examiner

ELECTRONIC DEVICE AND PREVENTION METHOD FOR PREVENTING DETERIORATION BY OPERATION OF ANTENNA MODULE

CROSS-REFERENCE TO RELATED APPLICATION(S)

This application is a continuation application, claiming priority under § 365(c), of an International application No. PCT/KR2022/007526, filed on May 27, 2022, which is based on and claims the benefit of a Korean patent application number 10-2021-0088585, filed on Jul. 6, 2021, in the Korean Intellectual Property Office, the disclosure of which is incorporated by reference herein in its entirety.

BACKGROUND

1. Field

The disclosure relates to an electronic device and method of preventing deterioration by an operation of an antenna module.

2. Description of Related Art

When an antenna module of an electronic device, such as a smartphone, operates at maximum effective isotropic radiated power (EIRP) in a frequency range 2 (FR2) band, a part of beams generated by the antenna module may cause deterioration in an electronic module, such as a global positioning system (GPS), Wi-Fi, an ultra-wideband (UWB), long-term evolution (LTE), or a camera.

In addition, when an antenna module operates at maximum EIRP in an FR2 band in an electronic device including a slideable or foldable display, a part of beams generated by the antenna module may cause deterioration in an electronic module, such as a GPS, Wi-Fi, a UWB, LTE, or a camera according to a folding angle of the foldable display or an aspect ratio of the slideable display. Therefore, even when a terminal operates a band supporting FR2 (e.g., n256 and n257), a method of preventing performance deterioration of an electronic module may be needed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and method of preventing performance deterioration of an electronic module (i.e., electronic circuitry) by identifying a beam associated with a currently operating electronic module when an antenna module (i.e., antenna) operates at maximum EIRP and by deactivating a certain beam among beams of the antenna module.

Additional aspects will be set forth in part in the description which follows and, in part, will be apparent from the description, or may be learned by practice of the presented embodiments.

In accordance with an aspect of the disclosure, an electronic device is provided. The electronic device includes a display configured to be folded and unfolded and including a display for providing content, a sensor configured to detect a state change of the display, an antenna configured to transmit and receive an electromagnetic wave, and at least one processor electrically connected to the display, the sensor, and the antenna, in which the at least one processor is configured to detect the state change of the display by using the sensor, identify one or more operating electronic circuitry among electronic circuitries in the electronic device, determine an electronic circuitry in which deterioration is caused by an operation of the antenna among the operating electronic circuitry based on the state change of the display and deactivate a certain beam among beams generated by the antenna to reduce deterioration of the determined electronic circuitry.

In accordance with another aspect of the disclosure, an electronic device is provided. The electronic device includes an antenna configured to transmit and receive an electromagnetic wave, and at least one processor electrically connected to the antenna, in which the at least one processor is configured to identify one or more operating electronic circuitry among electronic circuitries in the electronic device, determine an electronic circuitry in which deterioration is caused by an operation of the antenna among the operating electronic circuitry, and deactivate a certain beam among beams generated by the antenna to reduce deterioration of the determined electronic circuitry.

In accordance with another aspect of the disclosure, a method of preventing deterioration by an operation of an antenna is provided. The method includes identifying one or more operating electronic circuitry among electronic circuitries in an electronic device, determining an electronic circuitry in which deterioration is caused by an operation of the antenna among the operating electronic circuitry, and deactivating a certain beam among beams generated by the antenna to reduce deterioration of the determined electronic circuitry.

Example embodiments of the disclosure may provide an electronic device and method of preventing performance deterioration of an electronic circuitry by identifying a beam associated with a currently operating electronic circuitry when an antenna operates at maximum EIRP and by deactivating a certain beam among beams of the antenna.

Example embodiments of the disclosure may also provide an electronic device and method of preventing performance deterioration of an electronic circuitry by identifying a beam which may cause the performance deterioration of the electronic circuitry, based on a folding angle of a foldable display or an aspect ratio of a slideable display, and by deactivating the identified beam among beams of an antenna, in an electronic device including the slideable or foldable display.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description, taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
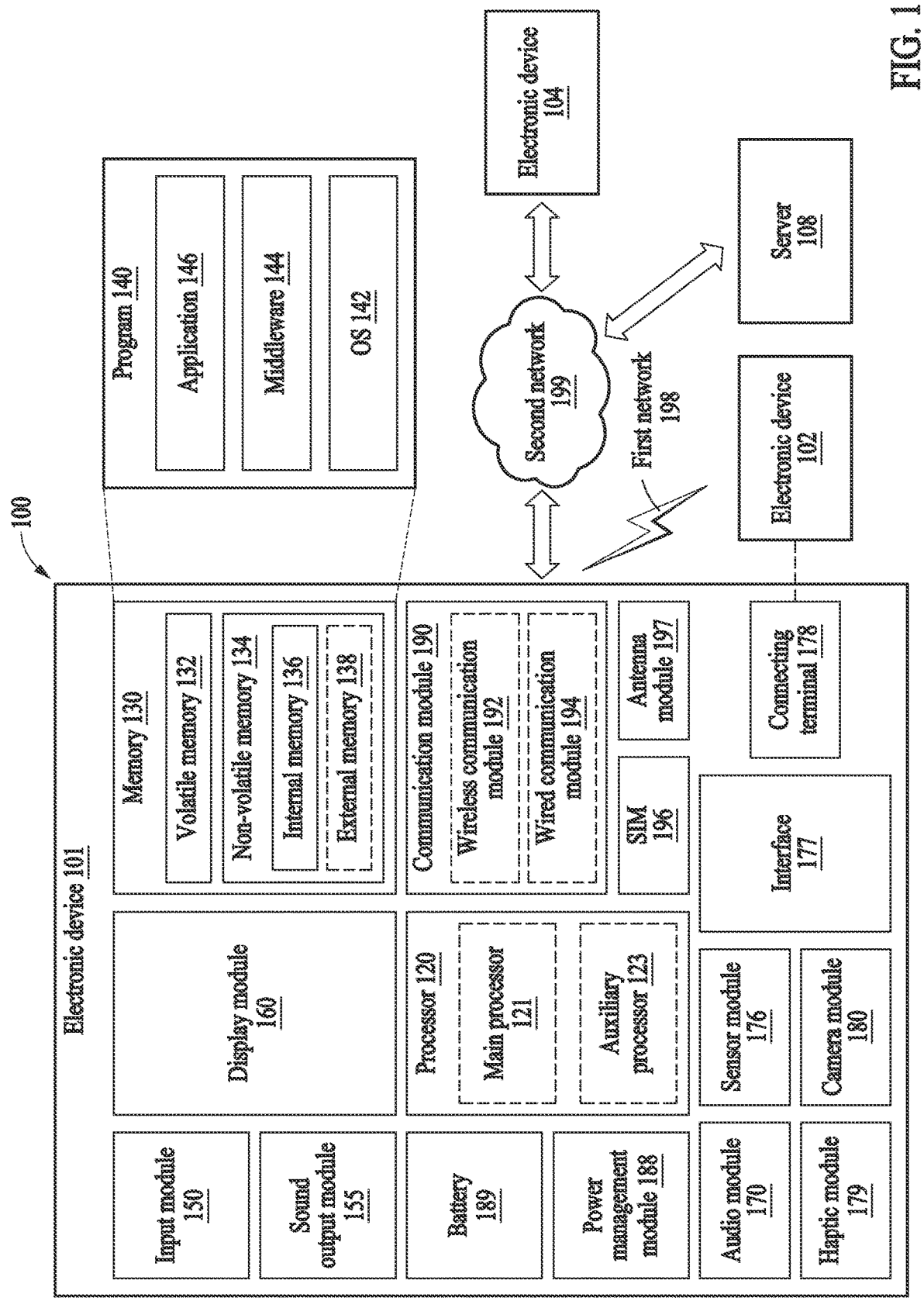
FIG. 1 is a block diagram of an electronic device according to an embodiment of the disclosure.

FIG. 1 is a block diagram of an electronic device according to an embodiment of the disclosure.

Referring to FIG. 1, an electronic device 101 in a network environment 100 may communicate with an electronic device 102 via a first network 198 (e.g., a short-range wireless communication network) or communicate with at least one of an electronic device 104 and a server 108 via a second network 199 (e.g., a long-range wireless communication network). The electronic device 101 may communicate with the electronic device 104 via the server 108. The electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. At least one of the components (e.g., the connecting terminal 178) may be omitted from the electronic device 101, or one or more other components may be added to the electronic device 101. Some of the components (e.g., the sensor module 176, the camera module 180, or the antenna module 197) may be integrated into a single component (e.g., the display module 160).

The processor 120 may execute, for example, software (e.g., a program 140) to control at least one other component (e.g., a hardware or software component) of the electronic device 101, connected to the processor 120, and may perform various data processing or computations. As at least a part of data processing or computations, the processor 120 may store a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to perform a specific function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). The auxiliary processor 123 (e.g., an ISP or a CP) may be implemented as a part of another component (e.g., the camera module 180 or the communication module 190) that is functionally related to the auxiliary processor 123. The auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. The receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. The display module 160 may include a touch sensor adapted to detect a touch, or a pressure sensor adapted to measure the intensity of force incurred by touch.

The audio module 170 may convert sound into an electric signal or vice versa. The audio module 170 may obtain the sound via the input module 150 or output the sound via the sound output module 155 or an external electronic device (e.g., the electronic device 102, such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101 and generate an electric signal or data value corresponding to the detected state. The sensor module 176 may include, for example, a gesture sensor, a gyro sensor, an atmospheric pressure sensor, a magnetic field sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with an external electronic device (e.g., the electronic device 102) directly (e.g., wiredly) or wirelessly. The interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). The connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus, which may be recognized by a user via his or her tactile sensation or kinesthetic sensation. The haptic module 179 may include, for example, a motor, a piezoelectric element, or an electric stimulator.

The camera module 180 may capture a still image and moving images. The camera module 180 may include one or more lenses, image sensors, ISPs, or flashes.

The power management module 188 may manage power supplied to the electronic device 101. The power management module 188 may be implemented as, for example, at least a part of a power management integrated circuit (PMIC).

The battery 189 may supply power to at least one component of the electronic device 101. The battery 189 may include, for example, a primary cell, which is not rechargeable, a secondary cell, which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel. The communication module 190 may include one or more CPs that are operable independently of the processor 120 (e.g., an AP) and support direct (e.g., wired) communication or wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with an external electronic device, for example, the electronic device 104, via the first network 198 (e.g., a short-range communication network, such as Bluetooth™, wireless-fidelity (Wi-Fi) direct, or IR data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as components (e.g., chips) separate from each other. The wireless communication module 192 may identify and authenticate the electronic device 101 in a communication network, such as the first network 198 or the second network 199 by using subscriber information (e.g., international mobile subscriber identity (IMSI)) stored in the SIM 196.

The wireless communication module 192 may support a 5G network after a 4G network, and next-generation communication technology, for example, new radio (NR) access technology. NR access technology may support enhanced mobile broadband (eMBB), massive machine-type communications (mMTC), or ultra-reliable and low-latency communications (URLLC). The wireless communication module 192 may support a high-frequency band (e.g., a millimeter wave (mmW) band) to achieve, for example, a high data transmission rate. The wireless communication module 192 may support various technologies for securing performance in a high-frequency band, such as beamforming, massive multiple-input and multiple-output (MIMO), full dimensional MIMO (FD-MIMO), an array antenna, analog beam-forming, or a large scale antenna. The wireless communication module 192 may support various requirements specified by the electronic device 101, an external electronic device (e.g., the electronic device 104), or a network system (e.g., the second network 199). The wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and an external electronic device via the at least one selected antenna. Another component (e.g., a radio frequency integrated circuit (RFIC)) other than the radiating element may be additionally formed as a part of the antenna module 197.

According to various example embodiments, the antenna module 197 may form a mmW antenna module. According to an example embodiment, the mmW antenna module may include a PCB, an RFIC disposed on a first surface (e.g., the bottom surface) of the PCB, or adjacent to the first surface thereof and capable of supporting a designated high-frequency band (e.g., a mmW band), and a plurality of antennas (e.g., array antennas) disposed on a second surface (e.g., the top or a side surface) of the PCB, or adjacent to the second surface thereof and capable of transmitting or receiving signals of the designated high-frequency band.

At least some of the above-described components may be coupled mutually and exchange signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and an external electronic device (e.g., the electronic device 104) via the server 108 coupled with the second network 199. Each of external electronic devices (e.g., the electronic devices 102 and 104) may be a device of the same type as or a different type from the electronic device 101. All or some of the operations to be executed by the electronic device 101 may be executed by one or more external electronic devices (e.g., the electronic devices 102 and 104 and the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or the service. The one or more external electronic devices that have received the request may perform the at least part of the function or the service requested, or an additional function or an additional service related to the request and may transfer an outcome of the performance to the electronic device 101. The electronic device 101 may provide the outcome, with or without further processing of the outcome, as at least part of a reply to the request. To that end, cloud computing, distributed computing, MEC, or client-server computing technology may be used, for example. The electronic device 101 may provide ultra-low-latency services using, for example, distributed computing or mobile edge computing. In an example embodiment, an external electronic device (e.g., the electronic device 104) may include an Internet-of-things (IoT) device. The server 108 may be an intelligent server using machine learning and/or a neural network. According to an example embodiment, an external electronic device (e.g., the electronic device 104 or the server 108) may be included in the second network 199. The electronic device 101 may be applied to intelligent services (e.g., a smart home, a smart city, a smart car, or healthcare) based on 5G communication technology or IoT-related technology.

Figure 2:
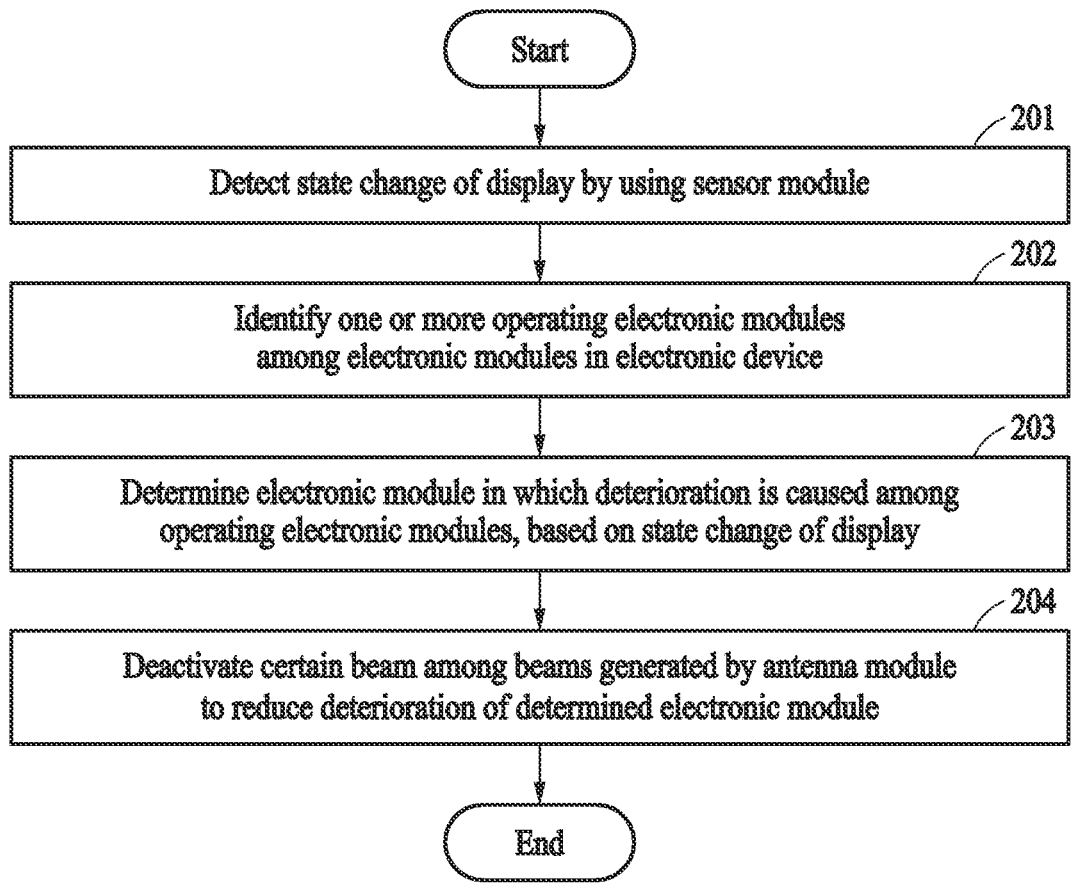
FIG. 2 is a flowchart of a prevention method when a display is slideable or foldable according to an embodiment of the disclosure.

FIG. 2 is a flowchart of a prevention method when a display is slideable or foldable according to an embodiment of the disclosure.

According to an embodiment, the processor 120 of the electronic device 101 may perform a method of preventing deterioration by an operation of the antenna module 197. According to an example embodiment, the electronic device 101 including a foldable or unfoldable display, for example, a rollable, slideable, or foldable display, for providing content, may deactivate a certain beam among beams of the antenna module 197 to reduce performance deterioration of an electronic module based on a state change of the display.

The electronic module (i.e., electronic circuitry) may refer to a module including modules needed by electronic components, such as the camera module 180, the communication module 190, and the sensor module 176 in the electronic device 101. The electronic module may include, for example, an ultra-wideband (UWB) module, a global positioning system (GPS) sensor, a Wi-Fi module, a long-term evolution (LTE) module, or the camera module 180. According to an example embodiment, the antenna module 197 of the electronic device 101 may include a mmW module (i.e., mmW circuitry).

According to another embodiment, the antenna module 197 may operate at maximum effective isotropic radiated power (EIRP) for communication (e.g., 5G communication) in a frequency range 2 (FR2) band or a microwave band. Accordingly, performance deterioration may be caused in the UWB module, the GPS sensor, the Wi-Fi module, the LTE module, or the camera module 180 among electronic modules.

In operation 201, the processor 120 may detect a state change of the display by using the sensor module 176. The state change may refer to a change of a form of a display, such as a change of a folding angle of a foldable display, a change of an aspect ratio in a slideable display, and the like.

The sensor module 176 may include a hall sensor for detecting an intensity of a magnetic field. When a form of the display changes, for example, a change of a folding angle of a foldable display, a change of an aspect ratio in a slideable display, and the like, the magnetic field may also change. The processor 120 may detect a state change of the display, based on a change of the magnetic field of the hall sensor.

The change of the magnetic field may be constant for each state change of the display, and the processor 120 may thus detect a state change of the display according to the change of the magnetic field and determine a current state of the display. In an example embodiment, when a foldable display is folded 180 degrees as illustrated in FIG. 5C, a measured magnetic field may be m. Therefore, when a magnetic field measured by the hall sensor is m, the processor 120 may determine that the foldable display has been folded 180 degrees.

In operation 202, the processor 120 may identify one or more operating electronic modules among electronic modules in the electronic device 101. The sequence of operations 201 and 202 may vary according to example embodiments. The processor 120 may identify an operating electronic module, for example, an operating UWB module, an operating GPS sensor, an operating Wi-Fi module, an operating LTE module, or an operating camera module (e.g., the camera module 180), in the electronic device 101. Identifying the operating electronic module may be implemented by a method readily implemented on, for example, Android, IO, and Tizen, by one of ordinary skill in the art.

In operation 203, the processor 120 may determine an electronic module in which deterioration is caused by an operation of the antenna module 197 among the operating electronic modules, based on a state change of the display.

According to yet another embodiment, when performance deterioration is caused by an electronic module, such as a UWB module, a GPS sensor, a Wi-Fi module, an LTE module, or the camera module 180, the received signal strength indication (RSSI) sensitivity measured by the electronic device 101 may be reduced. The processor 120 may calculate a noise level of the electronic module, such as a UWB module, a GPS module, a Wi-Fi module, an LTE module, or a camera module, in response to the performance degradation, based on the RSSI sensitivity.

According to an embodiment, the processor 120 may determine an electronic module in which deterioration is caused by an operation of the antenna module 197 among operating electronic modules, based on RSSI sensitivity. Information on electronic modules, in which performance deterioration is caused, may be preset based on RSSI sensitivity.

According to another embodiment, information on a type of an electronic module in which performance deterioration may be caused may be collected in advance for each state of a display, for example, a foldable display folded 90 degrees, a foldable display folded 180 degrees, a foldable display folded 0 degrees, a slideable display of which the height-to-width ratio is 16:9, or a slideable display of which the height-to-width ratio is 4:3.

In operation 204, the processor 120 may deactivate a certain beam among beams generated by the antenna module 197 to reduce deterioration of the determined electronic module. To compensate for the deactivated beam, the processor 120 may change a direction and a phase of each of the beams generated by the antenna module 197. The processor 120 may perform tilting on the beams or adjust a delay of the beams to compensate for the deactivated beam.

The processor 120 may calculate a noise level of the determined electronic module, and when the noise level is greater than or equal to a preset threshold, deactivate a certain beam among the beams generated by the antenna module 197 to reduce deterioration of the determined electronic module.

A threshold may not be limited to a certain value but may be preset by an experimentation or determined variously according to example embodiments. The processor 120, when the noise level is less than the threshold, without deactivating a certain beam of the antenna module 197, may maintain transmission at maximum EIRP by the antenna module 197.

Information on a beam causing performance deterioration may be collected in advance for each type of electronic module, for example, a UWB module, a GPS sensor, a Wi-Fi module, an LTE module, or the camera module 180, and for each state of a display, for example, a foldable display folded 90 degrees, a foldable display folded 180 degrees, a foldable display folded 0 degrees, a slideable display of which the height-to-width ratio is 16:9, or a slideable display of which the height-to-width ratio is 4:3.

The processor 120 may deactivate a certain beam among the beams of the antenna module 197 to minimize performance deterioration. A modified beam book may refer to a beam book for a mmW module in the antenna module 197.

The processor 120 may determine a beam causing deterioration in the determined electronic module among the beams generated by the antenna module 197. The processor 120 may determine a beam that may cause performance deterioration in an operating electronic module among the beams generated by the antenna module 197 in a current state of the display.

The processor 120 may deactivate the beam that may cause performance deterioration and generate the rest of the beams. The processor 120 may generate the rest of the beams, excluding the beam that may cause performance deterioration, and transmit the generated beams. The processor 120 may compensate for an output of the excluded beam by adjusting a delay of the rest of the beams, excluding the beam that may cause performance deterioration, or performing tilting on the rest of the beams.

Minimizing the effect of the beam that may cause performance deterioration may reduce the performance deterioration of an electronic module. In an example embodiment, when a foldable display is in a 90-degree folding state, performance deterioration may be caused in a GPS by a first beam.

The processor 120 may generate beams by using a beam book preset to reduce deterioration of the determined electronic module. According to an example embodiment, the processor 120 may modify a beam book of the antenna module 197 by using an artificial intelligence model trained to determine the beam book for minimizing performance deterioration of an electronic module, without excluding a beam causing performance deterioration of the determined electronic module among the beams generated by the antenna module 197.

The artificial intelligence model may be trained to determine the beam book, based on a state of the display and an electronic module. Input data of the artificial intelligence model may be the state of the display and the type of the electronic module. Output data may be a beam book for minimizing performance deterioration of the electronic module. The beam book may be information defining a direction and phase values of respective beams. The processor 120 may generate beams to be transmitted according to the beam book defining information on each beam.

According to an embodiment, reinforcement learning may be used for training of the artificial intelligence model. In an example embodiment, the processor 120 may train the artificial intelligence model for minimizing performance deterioration caused by a beam book determined by the artificial intelligence model. The artificial intelligence model may not be limited to a certain example, and various types of artificial intelligence models may be used.

According to another embodiment, the processor 120 may adjust an intensity of a part of beams to minimize performance deterioration, without excluding a beam causing performance deterioration in the determined electronic module among the beams generated by the antenna module 197, or by using a phase shifter (e.g., a phase shifter 403 of FIGS. 4A, 4B, and 4C), reduce an intensity of the beam causing performance deterioration in the electronic module.

According to yet another embodiment, when the antenna module 197 outputs transmission power of 24 decibel-milliwatts (dBm) with 10 beams, the processor 120 may determine an electronic module (e.g., a Wi-Fi module, an LTE module, a GPS module, a camera module, etc.) in which performance deterioration may be caused by 10 beams among currently operating electronic modules and modify a beam book for setting EIRP of a beam causing performance deterioration in the determined electronic module to 22 dBm, without excluding the beam causing the performance deterioration of the determined electronic module. The processor 120 may reduce EIRP by controlling a gain of a power amplifier of an RFIC.

When the display returns to an original state thereof, the processor 120 may detect a state change of the display and modify the beam book to a previously used beam book. In a case of a foldable display, the modification of the beam book may be performed when a folding angle of the foldable display is 90 degrees and when the folding angle is 180 degrees.

In a case of a foldable display, the modification of the beam book may be performed based on the type of an operating electronic module when a folding angle of the foldable display is 90 degrees and when the folding angle is 180 degrees. A state of the foldable display may not be limited to a certain example and may be determined variously according to example embodiments.

The modification of the beam book may be performed based on the type of an operating electronic module, when the height-to-width ratio of the slideable display is 20:9, when the height-to-width ratio of the slideable display is 16:9, and when the height-to-width ratio of the slideable display is 4:3. A state of the slideable display may not be limited to a certain example and may be determined variously according to example embodiments.

Figure 3:
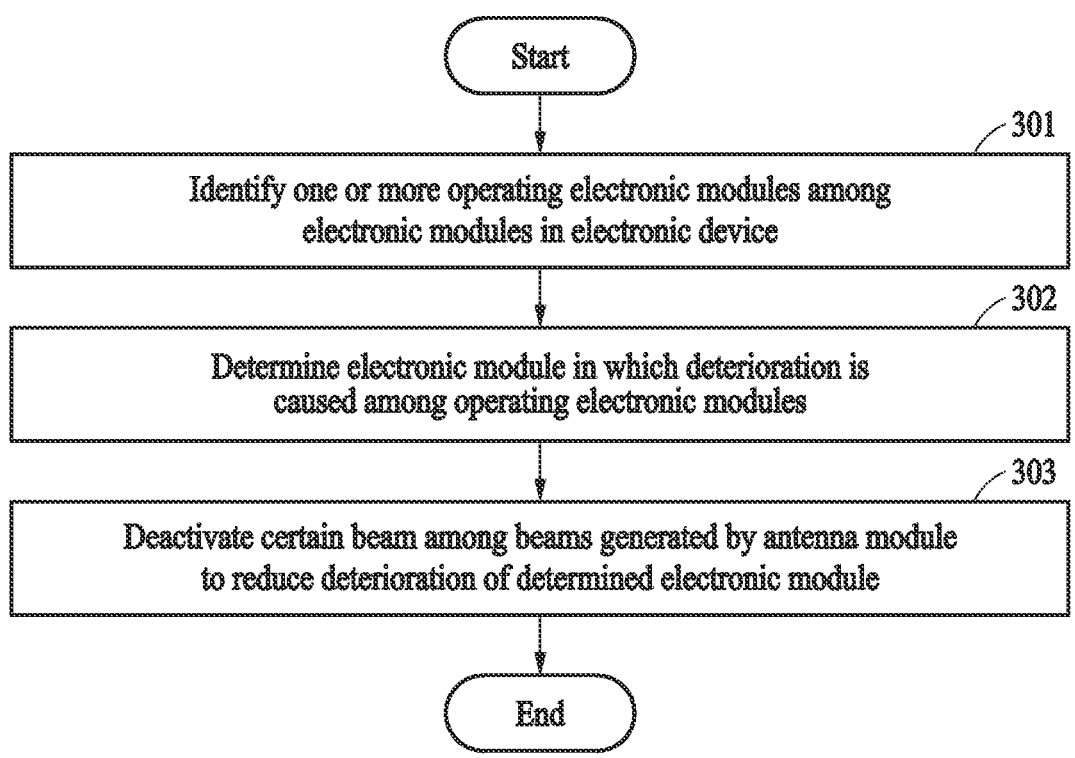
FIG. 3 is a flowchart of a prevention method when a display is a bar type according to an embodiment of the disclosure.

FIG. 3 is a flowchart of a prevention method when a display is a bar type according to an embodiment of the disclosure.

When the display is a bar type, performance deterioration may be caused in a portion of electronic modules (e.g., a UWB module, a GPS sensor, a Wi-Fi module, an LTE module, or the camera module 180), when the antenna module 197 operates at maximum EIRP, even without a state change of a display. A certain beam among beams generated by the antenna module 197 may be deactivated to reduce performance deterioration of an electronic module.

In operation 301, the processor 120 may identify one or more operating electronic modules among electronic modules in the electronic device 101. The processor 120 may identify an operating electronic module, for example, an operating UWB module, an operating GPS sensor, an operating Wi-Fi module, an operating LTE module, or an operating camera module (e.g., the camera module 180), in the electronic device 101.

In operation 302, the processor 120 may determine an electronic module in which deterioration is caused by an operation of the antenna module 197 among the operating electronic modules. For example, the processor 120 may determine the electronic module in which deterioration is caused by an operation of the antenna module 197 among operating electronic modules, based on RSSI sensitivity.

Information on electronic modules, in which performance deterioration is caused, may be preset based on RSSI sensitivity. In an example embodiment, information on a type of an electronic module in which performance deterioration may be caused may be collected in advance when the antenna module 197 operates in a mmW band at maximum EIRP.

In operation 303, the processor 120 may deactivate a certain beam among the beams generated by the antenna module 197 to reduce deterioration of the determined electronic module.

According to an embodiment, the processor 120 may calculate a noise level of the determined electronic module, and when the noise level is greater than or equal to a preset threshold, the certain beam among the beams generated by the antenna module 197 may be deactivated to reduce deterioration of the determined electronic module. A threshold may not be limited to a certain value but may be preset by experimentation or determined variously according to example embodiments. The processor 120, when the noise level is less than the threshold, without modifying a beam book of the antenna module 197, may maintain transmission at maximum EIRP by the antenna module 197.

According to another embodiment, when the antenna module 197 operates at the maximum EIRP in the mmW band, a beam that may cause performance deterioration may be collected in advance for each type of electronic module (e.g., a UWB module, a GPS sensor, a Wi-Fi module, an LTE module, or the camera module 180).

According to yet another embodiment, the processor 120 may determine a beam causing deterioration in the determined electronic module among the beams generated by the antenna module 197. For example, the processor 120 may determine the beam causing deterioration in the determined electronic module among the beams generated by the antenna module 197, in a current state of the display.

According to an embodiment, the processor 120 may deactivate the beam that may cause performance deterioration and generate the rest of the beams. The processor 120 may deactivate a beam identification (ID) to prevent the beam that may cause performance degradation from being generated.

The processor 120 may compensate for an output of the excluded beam by adjusting a delay of the rest of the beams, excluding the beam that may cause performance deterioration, or performing tilting on the rest of the beams. Minimizing the effect of the beam that may cause performance deterioration may reduce the performance deterioration of an electronic module.

According to another embodiment, performance deterioration may be caused in Wi-Fi by a second beam. The processor 120 may modify the beam book to compensate for the output of a first beam by using the rest of the beams, excluding the second beam.

According to yet another embodiment, the processor 120 may modify a beam book of the antenna module 197 by using an artificial intelligence model trained to determine a beam book for minimizing performance deterioration of an electronic module, without excluding a beam causing performance deterioration of the determined electronic module among the beams generated by the antenna module 197.

For example, the artificial intelligence model may be trained to determine a beam book, based on a state of the display and an electronic module. Input data of the artificial intelligence model may be the state of the display and the type of the electronic module. Output data may be the beam book for minimizing performance deterioration of the electronic module.

According to an embodiment, reinforcement learning may be used for training of the artificial intelligence model. The processor 120 may train the artificial intelligence model for minimizing performance deterioration caused by the beam book determined by the artificial intelligence model. The artificial intelligence model may not be limited to a certain example, and various types of artificial intelligence models may be used.

According to another embodiment, the processor 120 may adjust an intensity of a part of beams for minimizing performance deterioration, without excluding a beam causing performance deterioration in the determined electronic module among the beams generated by the antenna module 197, or by using a phase shifter (e.g., the phase shifter 403 of FIGS. 4A, 4B, and 4C), reduce an intensity of the beam causing performance deterioration in the electronic module.

For example, when the antenna module 197 outputs transmission power of 24 decibels dBm with 10 beams, the processor 120 may determine an electronic module (e.g., a Wi-Fi module, an LTE module, a GPS module, a camera module, etc.) in which performance deterioration may be caused by 10 beams among currently operating electronic modules and modify a beam book for setting EIRP of a beam causing performance deterioration in the determined electronic module to 22 dBm, without excluding the beam causing the performance deterioration of the determined electronic module. The processor 120 may reduce EIRP by controlling a gain of a power amplifier of an RFIC.

Figure 4A:
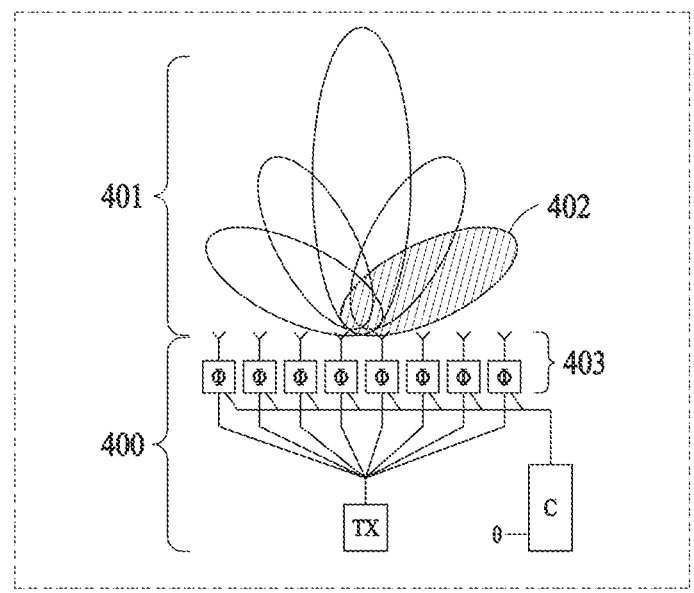
FIGS. 4A, 4B, and 4C are diagrams of deactivating a beam of an antenna module according to various embodiments of the disclosure.
Figure 4B:
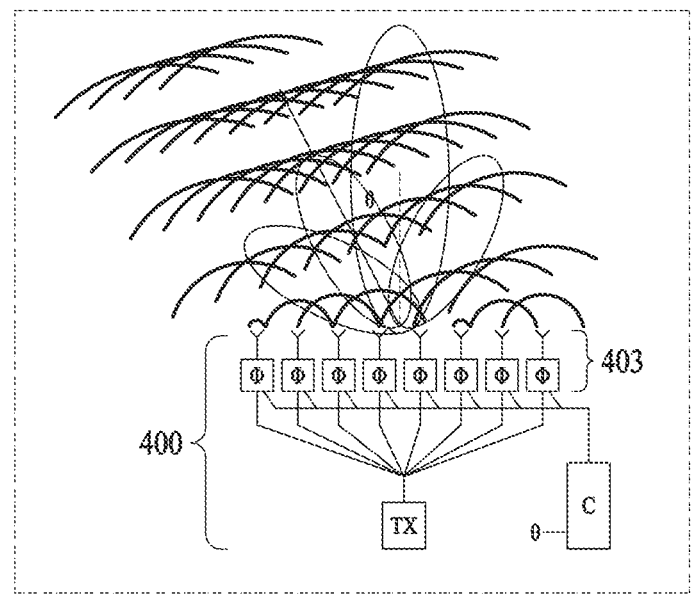
Figure 4C:
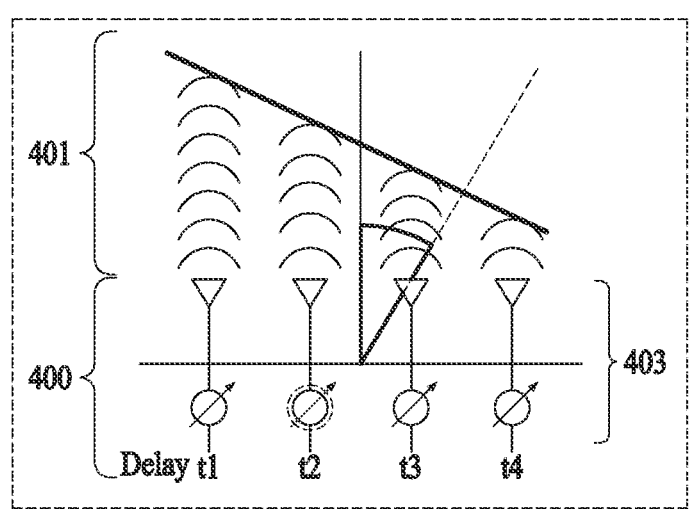

FIGS. 4A, 4B, and 4C each are a diagram of deactivating a beam of the antenna module 197 according to various embodiments of the disclosure.

Referring to FIG. 4A, a transmitter 400 of the antenna module 197 may include an antenna element and a phase shifter.

Referring to FIG. 4A, the antenna module 197 may generate 5 beams. The processor 120 may identify a beam 402 causing performance deterioration in an electronic module among five beams 401.

FIG. 4B illustrates an example of tilting of the rest of the beams, excluding the beam 402 causing performance deterioration in an electronic module.

FIG. 4C illustrates an example of generating the rest of the beams, excluding the beam 402 causing performance deterioration in an electronic module, by adjusting a delay.

The processor 120 may modify a beam book of the antenna module 197 by using an artificial intelligence model trained to determine a beam book for minimizing performance deterioration of an electronic module, without excluding the beam 402 causing performance deterioration of the determined electronic module among the beams 401 generated by the antenna module 197.

In addition, the processor 120 may adjust an intensity of a part of beams (e.g., the beam 402) for minimizing performance deterioration, without excluding the beam 402 causing performance deterioration in the determined electronic module among the beams 401 generated by the antenna module 197, reduce an intensity of the beam 402 causing performance deterioration in the electronic module, or reduce EIRP by controlling a gain of a power amplifier of an RFIC.

Figure 5A:
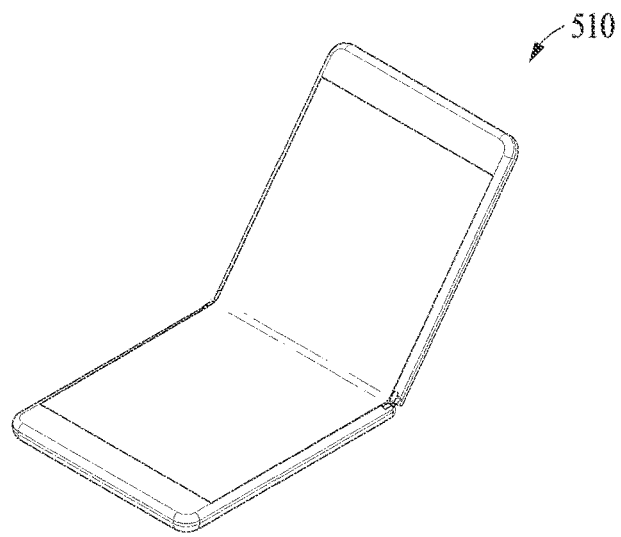
FIGS. 5A, 5B, and 5C are diagrams of a foldable display according to various embodiments of the disclosure.
Figure 5B:
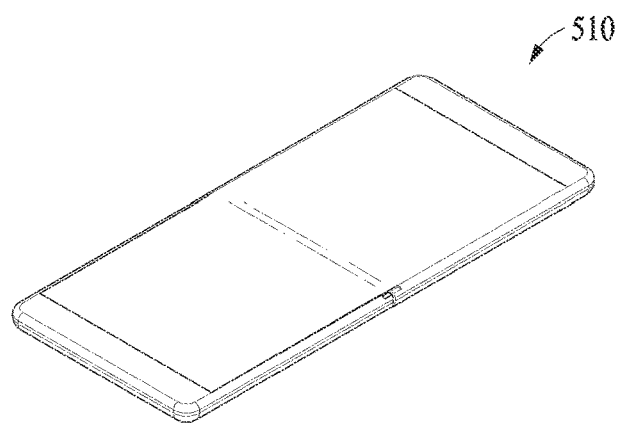
Figure 5C:
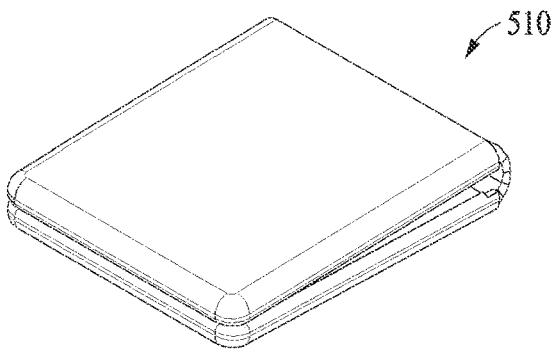

FIGS. 5A, 5B, and 5C are diagrams of a foldable electronic device 510 with a foldable display according to various embodiments of the disclosure.

FIGS. 5A through 5C are diagrams of various folding angles of the foldable display according to an example embodiment. In a case of a foldable display, deactivation of a certain beam may be performed based on the type of an operating electronic module when a folding angle of the foldable display is 90 degrees and when the folding angle is 180 degrees. A state of the foldable display may not be limited to a certain example and may be determined variously according to example embodiments.

Figure 6A:
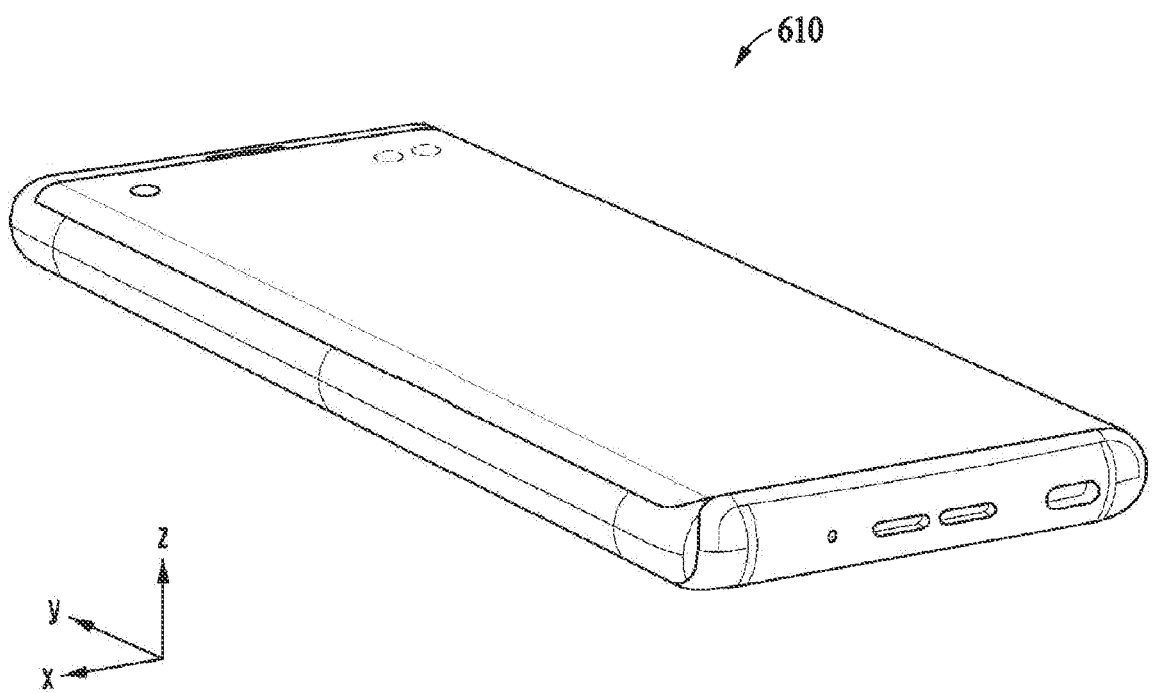
FIGS. 6A and 6B is a diagram of a slideable display according to various embodiments of the disclosure.
Figure 6B:
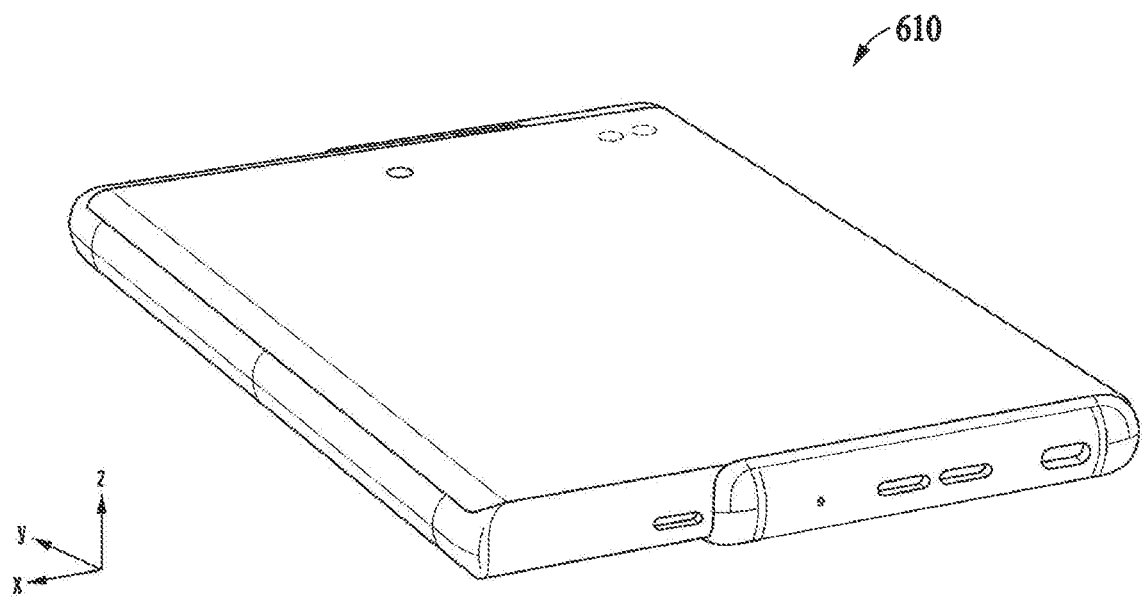

FIGS. 6A and 6B are diagrams of a slidable electronic device 610 with a slideable display according to various embodiments of the disclosure.

Deactivation of a certain beam may be performed based on a type of an operating electronic module, when a height-to-width ratio of the slideable display is 20:9, when the height-to-width ratio of the slideable display is 16:9, and when the height-to-width ratio of the slideable display is 4:3. A state of the slideable display may not be limited to a certain example and may be determined variously according to example embodiments.

Such a deactivation method may be applicable to various types of displays other than the illustrated displays.

According to an embodiment, an electronic device may include a display module 160 configured to be folded and unfolded and including a display for providing content; a sensor module 176 configured to detect a state change of the display; an antenna module 197 configured to transmit and receive an electromagnetic wave; and a processor 120 electrically connected to the display module 160, the sensor module 176, and the antenna module 197, in which the processor 120 is configured to detect a state change of the display by using the sensor module 176, identify one or more operating electronic modules among electronic modules in the electronic device, determine an electronic module in which deterioration is caused by an operation of the antenna module 197 among the operating electronic modules, based on a state change of the display, and deactivate a certain beam among beams generated by the antenna module 197 to reduce deterioration of the determined electronic module.

The processor 120 may determine a beam causing deterioration in the determined electronic module among the beams generated by the antenna module 197 and deactivate the determined beam.

The sensor module 176 may include a hall sensor, and the processor 120 may detect a state change of the display, based on a change of a magnetic field of the hall sensor.

The processor 120 may calculate a noise level of the determined electronic module, and when the noise level is greater than or equal to a preset threshold, generate the beams by using a beam book preset to reduce deterioration of the determined electronic module.

The antenna module 197 may include a mmW module and operate at maximum EIRP.

According to another embodiment, an electronic device includes an antenna module 197 configured to transmit and receive an electromagnetic wave; and a processor 120 electrically connected to the antenna module 197, in which the processor 120 is configured to identify one or more operating electronic modules among electronic modules in the electronic device, determine an electronic module in which deterioration is caused by an operation of the antenna module 197 among the operating electronic modules, and deactivate a certain beam among beams generated by the antenna module 197 to reduce deterioration of the determined electronic module.

The processor 120 may determine a beam causing deterioration in the determined electronic module among the beams generated by the antenna module 197 and deactivate the determined beam.

The sensor module 176 may include a hall sensor, and the processor 120 may detect a state change of the display, based on a change of a magnetic field of the hall sensor.

The processor 120 may calculate a noise level of the determined electronic module, and when the noise level is greater than or equal to a preset threshold, generate the beams by using a beam book preset to reduce deterioration of the determined electronic module.

The antenna module 197 may include a mmW module and operate at maximum EIRP.

According to yet another embodiment, a method of preventing deterioration by an operation of an antenna module 197 includes identifying one or more operating electronic modules among electronic modules in an electronic device; determining an electronic module in which deterioration is caused by an operation of the antenna module 197 among the operating electronic modules; and deactivating a certain beam among beams generated by the antenna module 197 to reduce deterioration of the determined electronic module.

The method may further include detecting a state change of the display, and the determining of the electronic module may include determining an electronic module in which deterioration is caused by an operation of the antenna module 197 among the operating electronic modules, based on a state change of the display.

The detecting of a state change of the display may detect the state change of the display based on a change of a magnetic field.

The certain beam may be a beam causing deterioration in the determined electronic module, and the deactivating of the certain beam may determine the certain beam, deactivate the determined beam, and activate the rest of the beams.

The deactivating of the certain beam may calculate a noise level of the determined electronic module, and when the noise level is greater than or equal to a preset threshold, generate the beams by using a beam book preset to reduce deterioration of the determined electronic module.

The antenna module 197 may include a mmW module and operate at maximum EIRP.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that various example embodiments of the disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., an internal memory 136 or an external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
 a display module configured to:
  be folded and unfolded, and comprising a display for providing content;
 a sensor module configured to detect a state change of the display;
 an antenna module configured to transmit and receive an electromagnetic wave; and
 at least one processor electrically connected to the display module, the sensor module, and the antenna module,
 wherein the at least one processor is configured to:
  detect a state change of the display by using the sensor module,
  identify one or more operating electronic modules among electronic modules in the electronic device,
  determine an electronic module where performance deterioration is caused by an operation of the antenna module among the one or more operating electronic modules, based on the state change of the display,
  calculate a noise level of the determined electronic module in response to the performance deterioration, and
  deactivate a certain beam among beams generated by the antenna module to reduce the performance deterioration of the determined electronic module based on the calculation of the noise level.

2. The electronic device of claim 1, wherein the at least one processor is further configured to:
 determine a beam causing the performance deterioration in the determined electronic module among the beams generated by the antenna module and
 deactivate the determined beam.

3. The electronic device of claim 1,
 wherein the sensor module comprises a hall sensor, and
 wherein the at least one processor is further configured to detect a state change of the display, based on a change of a magnetic field of the hall sensor.

4. The electronic device of claim 1, wherein,
 when the noise level is greater than or equal to a preset threshold, generate the beams by using a beam book preset to reduce the performance deterioration of the determined electronic module.

5. The electronic device of claim 1,
 wherein the antenna module comprises a millimeter wave (mmW) module and
 wherein the antenna module is configured to operate at maximum equivalent isotropic radiated power (EIRP).

6. An electronic device comprising:
 an antenna module configured to transmit and receive an electromagnetic wave; and
 at least one processor electrically connected to the antenna module,
 wherein the at least one processor is configured to:
  identify one or more operating electronic modules among electronic modules in the electronic device,
  determine an electronic module where performance deterioration is caused by an operation of the antenna module among the one or more operating electronic modules,
  calculate a noise level of the determined electronic module in response to the performance deterioration, and
  deactivate a certain beam among beams generated by the antenna module to reduce the performance deterioration of the determined electronic module based on the calculation of the noise level.

7. The electronic device of claim 6, wherein the at least one processor is further configured to:
 determine a beam causing the performance deterioration in the determined electronic module among the beams generated by the antenna module, and
 deactivate the determined beam.

8. The electronic device of claim 6, further comprising:
 a display module configured to:
  be folded and unfolded, and comprising a display for providing content; and
 a sensor module configured to detect a state change of the display,
 wherein the sensor module comprises a hall sensor, and
 wherein the at least one processor is further configured to detect a state change of the display, based on a change of a magnetic field of the hall sensor.

9. The electronic device of claim 6, wherein,
 when the noise level is greater than or equal to a preset threshold, generate the beams by using a beam book preset to reduce the performance deterioration of the determined electronic module.

10. The electronic device of claim 6,
 wherein the antenna module comprises a millimeter wave (mmW) module and
 wherein the antenna module is configured to operate at maximum equivalent isotropic radiated power (EIRP).

11. A method of preventing performance deterioration by an operation of an antenna module, the method comprising:
 identifying one or more operating electronic modules among electronic modules in an electronic device;
 determining an electronic module where the performance deterioration is caused by an operation of the antenna module among the one or more operating electronic modules;
 calculating a noise level of the determined electronic module in response to the performance deterioration; and
 deactivating a certain beam among beams generated by the antenna module to reduce the performance deterioration of the determined electronic module based on the calculating of the noise level.

12. The method of claim 11, further comprising:
 detecting a state change of a display; and
 wherein the determining of the electronic module comprises determining an electronic module where the performance deterioration is caused by an operation of the antenna module among the one or more operating electronic modules, based on the state change of the display.

13. The method of claim 12, wherein the detecting of a state change of the display comprises detecting a state change of the display, based on a change of a magnetic field.

14. The method of claim 11,
 wherein the certain beam is a beam causing the performance deterioration in the determined electronic module, and wherein the deactivating of the certain beam comprises:
   determining the certain beam,
   deactivating the determined beam, and
   activating the rest of the beams.

15. The method of claim 11, wherein the deactivating of the certain beam comprises,
   when the noise level is greater than or equal to a preset threshold, generating the beams by using a beam book preset to reduce the performance deterioration of the determined electronic module.

16. The method of claim 11,
   wherein the antenna module comprises:
      a millimeter wave (mmW) module, and
   wherein the antenna module is configured to operate at maximum equivalent isotropic radiated power (EIRP).

17. The method of claim 11, wherein the electronic device includes at least one of a rollable display, a slideable display, or a foldable display.

18. The method of claim 11, further comprising:
   changing a direction and a phase of the certain beam among beams generated by the antenna module.

19. The method of claim 11, further comprising:
   adjusting a delay of the certain beam among beams generated by the antenna module.

* * * * *